(No Model.)
H. PEARSON.
STUBBLE REJECTER.
No. 571,138. Patented Nov. 10, 1896.
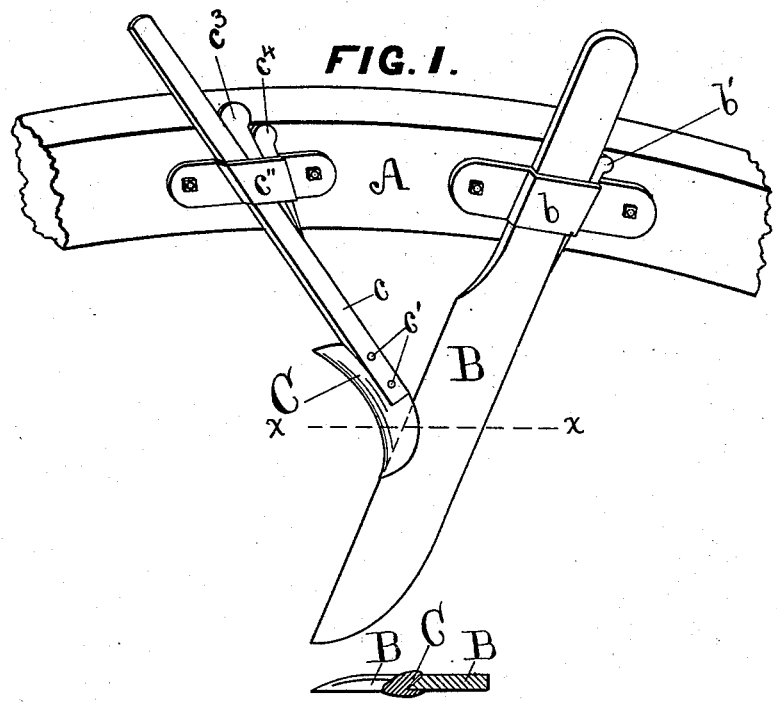
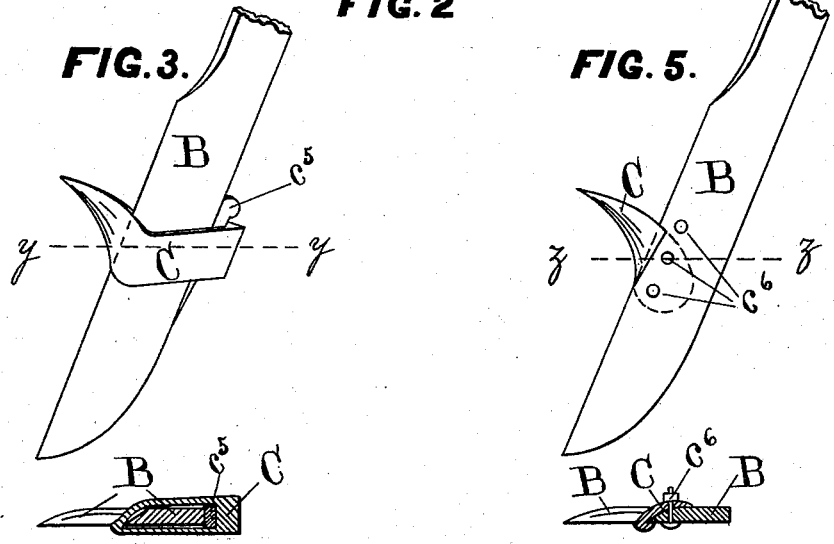
WITNESSES
George A. Chapman.
Hiram J. Owen.
INVENTOR
Harvey Pearson
per George B. Shepard, Attorney.

United States Patent Office.

HARVEY PEARSON, OF DE PEYSTER, NEW YORK.

STUBBLE-REJECTER.

SPECIFICATION forming part of Letters Patent No. 571,138, dated November 10, 1896.

Application filed September 14, 1895. Serial No. 562,490. (No model.)

*To all whom it may concern:*

Be it known that I, HARVEY PEARSON, a citizen of the United States of America, residing at De Peyster, in the county of St. Lawrence and State of New York, have invented certain Improvements in Stubble-Rejecters, of which the following is a specification.

My invention relates to that class of stubble-rejecters which are used in conjunction with colters of agricultural plows; and the object of my improvement is to furnish economical and convenient means for preventing the accumulation of stubble and rubbish on the colter of the plow, which causes it to drag, catch, and hold the soil and prevent proper action of the plow and greatly add to its draft. This object I attain by the mechanism illustrated in the accompanying drawings, which form a part of this specification, and in which—

Figures 1, 3, and 5 are side elevations of my improved stubble-rejecter, showing different modes of attaching the same to the ordinary plow. Fig. 2 is a cross-section of Fig. 1 on the line $x\,x$, viewed from above. Fig. 4 is a cross-section of Fig. 3 on the line $y\,y$, viewed from above; and Fig. 6 is a cross-section of Fig. 5 on the line $z\,z$, viewed from above.

In said figures, A represents a portion of the plow-beam of an ordinary agricultural plow; B, the colter, secured to the plow-beam in the usual form and manner; and C represents my improved stubble-rejecter, which consists of a forwardly-curved metal horn having a wedge-shaped front edge, with its rear portion bifurcated, so as to straddle and fit over the sharpened edge of the ordinary plow-colter, with means for adjustably securing it rigidly in position upon said colter.

In the mode of attachment shown at Fig. 1 the stubble-rejecter is first secured to a rod $c$ by ordinary means, such as bolts or rivets, as shown at $c'$. This rod is then passed upward through the socket of the clamp $c''$, rigidly bolted to the plow-beam, until the bifurcated edge of the stubble-rejecter will embrace the front edge of the plow-colter immediately above the point thereon where the surface of the ground will come in plowing. This rejecter-rod is then secured within the socket of said clamp by driving down the wedges $c^3$ and $c^4$ tightly in the position shown at Fig. 1, or, these wedges being made of different taper, it is apparent that by shifting their positions within said clamp-socket and drawing said rod upward or downward therein the adjustment of said rejecter upon the colter may be readily varied.

In the second mode of attachment (shown at Figs. 3 and 4) both branches of the bifurcated end of the stubble-rejecter are extended backward and brought together behind the plow-colter, so as to form a band around the colter, and having its rear inside edge made with an incline to adapt it to receive the wedge-piece $c^5$, which, after the rejecter is properly adjusted in the desired position upon the colter, is driven down between the rear edge of the colter and said incline on the rejecter, as shown at Fig. 3, thereby holding the rejecter firmly in place upon the colter.

In the third mode of attachment (shown at Figs. 5 and 6) one of the branches of the bifurcation on the rejecter is prolonged to form a brace on one side of the colter, a hole drilled horizontally therethrough and through the colter, so as to coincide therewith when the rejecter is placed in the desired position on the colter, and a bolt passed through said last-named two holes and secured therein in the usual manner. It is apparent that in this mode of attachment a number of holes may be drilled through the plow-colter, as shown at Fig. 5, to allow of a number of different adjustments of the stubble-rejecter on the colter.

My improved stubble-rejecter being attached to the plow in either of the ways above described and the plow drawn through the soil in the usual manner, the stubble or rubbish on the surface of the ground which is not cut by the colter will ride up under the rejecter and fall or roll over and be drawn away as the plow passes along, while in plowing stubble-ground or land having rubbish upon it with the ordinary plow the stubble or rubbish will ride up upon the colter till it reaches the plow-beam, where it will lodge and stick until removed by the plowman, usually with his foot, after stopping the progress of the plow for that purpose.

I am aware that plow-colters have been heretofore constructed having a blade or wing made integral therewith for the purpose of throwing the rubbish away from the plow-beam; but that form of construction is expensive to manufacture and repair, difficult to sharpen, and necessitates the substitution of an entire colter on the plow when changing work from stubble to clean or stony land, as is frequently the case in a farmer's ordinary day's labor, while my improved stubble-rejecter can be manufactured at small cost, is quickly adjusted to the ordinary plow-colter in a number of different positions to adapt it to the work in hand, and so light in weight that it can be easily removed from the plow when not wanted and carried in the plowman's pocket without inconvenience. These advantages of my invention over other stubble-rejecters now in use save money, time, and labor, and greatly facilitate the work of plowing stubble-land.

Having thus described my improved stubble-rejecter and manner of operating the same, what I claim as my invention, and desire to secure by Letters Patent, is—

A stubble-rejecter comprising a curved metal horn, having a wedge-shaped front edge and bifurcated rear portion adapted to straddle and fit over the sharpened edge of the ordinary plow-colter.

In testimony that I claim the foregoing as my own I have hereunto affixed my signature in the presence of two witnesses.

HARVEY PEARSON.

Witnesses:
 ROLLA HILL,
 ISAAC L. WELLS.